United States Patent Office.

FRANZ KONRAD, OF ZSCHIEREN, NEAR DRESDEN, ASSIGNOR TO HIMSELF AND JOSEF FERDINAND NOTZ, OF DRESDEN, SAXONY, GERMANY.

COMPOSITION FOR FIREPROOFING FABRICS.

SPECIFICATION forming part of Letters Patent No. 319,100, dated June 2, 1885.

Application filed April 7, 1885. (No specimens.)

*To all whom it may concern:*

Be it known that I, FRANZ KONRAD, of Zschieren, near Dresden, Kingdom of Saxony, German Empire, have invented certain new and useful improvements in compositions for rendering fabrics fire-proof, and also repellent to vermin, and counteracting infection from spores, fungi, bacteria, &c., of which the following is a specification.

In the United States Patent No. 308,679, granted to me on December 2, 1884, I have described a composition for the purpose of rendering fabrics fire-proof, and also repellent to vermin, and to counteract infection from spores, fungi, bacteria, &c.

My present invention refers to an improvement of the said composition in using such bodies or substances in addition to the bodies or substances specified in my above-recited United States Patent, which will render the fabrics or other matters treated with the improved composition better adapted to the purpose specified.

In manufacturing the composition I make use of an addition of chloride of lime, dissolved in water in a saturated state or condition, in order to prevent any solidification of the liquid or any precipitation or crystallization of salts formed within the composition, and I furthermore make use of Peruvian balsam in admixture of the above-mentioned composition in such a form and by such process, so as to form an emulsion capable of being easily absorbed or sucked up by any fabric or such matter which shall be rendered fire-proof, repellent to vermin, and counteracting all infections, as above stated.

I wish to mention that Peruvian balsam has proved to be in a high degree disinfecting or repellent to the *Acarus exulcerans* or other insects, the quality of the Peruvian balsam in this respect being fully preserved in my composition, whereas on the one hand its aromatic quality will materially improve the fabric treated with my composition, and on the other hand the combustible quality of this balsam is annihilated by the other ingredients of the composition. To prepare this liquid I proceed as follows: I employ ninety kilograms (equal to ninety liters) of water, and add ten kilograms of sulphate of ammonia, one kilogram of carbonate of ammonia, 0.5 (one-half) kilogram of borax, 0.1 (one-tenth) kilogram of bichloride of mercury, and I further add a decoction of peppermint, which I produce and add in the manner specified in my United States Patent No. 308,679, and I further add to the solution one hundred and fifty grams of solution of carbolic acid, which has a specific gravity of about 1.062 at 20° Celsius. After these ingredients have been added and well mixed together I add the same to a solution which I prepare by dissolving six kilograms of bitungstate of soda into ninety-four kilograms of water. Immediately after the addition of this solution I add to the liquid so much of a saturated solution of chloride of lime (ten parts of water to one part of chloride of lime) as will suffice to prevent any solidification of the liquid or any precipitation or crystallization of double or triple salts formed by the admixture of the above ingredients. The liquid thus obtained is poured into a vessel, which is provided with an agitator in order to very intensely agitate or stir the liquid for the following process. The vessel is connected by a pipe to a retort, into which latter I introduce a solution formed by dissolving one kilogram of Peruvian balsam and 0.3 (three-tenths) of a kilogram of camphor in two kilograms of ether. I have found acetic ether to answer the purpose well, but I do not limit myself to this specific ether. This solution is distilled off in the retort by a moderate heat, the product of distillation being conducted into the well agitated and stirred liquid in the other vessel, where the agitated liquid is kept at a temperature of 56° Reaumur, and an emulsion is formed constituting the liquid of the qualities for the purpose specified. This liquid is readily absorbed into any fabric or other material, and it becomes fire-proof, so as not to burn with a flame, and repellent to vermin, and resists or counteracts the deposit of morbid or diseased matter or fungi, spores, bacteria, &c. I wish it expressly understood that such action of the liquid on the fabric is not transitory, requiring frequent repetition, but in most cases it remains permanent as long as the fabric will last before being worn out.

I may mention that, although I have found the proportions of materials employed, as above stated, as best for the purpose, I do not limit myself to this proportion, as they may be varied without departing from my invention.

I do not herein claim the separate use of the ingredients set forth.

I claim as my invention—

The liquid for rendering fabrics, &c., fireproof, repellent to vermin, and counteractant to morbid or diseased matter, or the infection from spores, fungi, bacteria, &c., composed of a solution of sulphate of ammonia, carbonate of ammonia, borax, bichloride of mercury, peppermint, carbolic acid, bitungstate of soda, and chloride of lime transformed into an emulsion by leading into the solution the products obtained from the distillation of a solution of Peruvian balsam and camphor, substantially as set forth.

In testimony that I claim the foregoing as my invention I have signed my name in presence of two subscribing witnesses.

FRANZ KONRAD.

Witnesses:
   WILHELM WRESENHÜTTER,
   GEORG RICHTER.